April 5, 1938.  H. SCHUHMANN  2,113,434
PROCESS OF MAKING LAMINATED MATERIAL
Filed Dec. 16, 1935
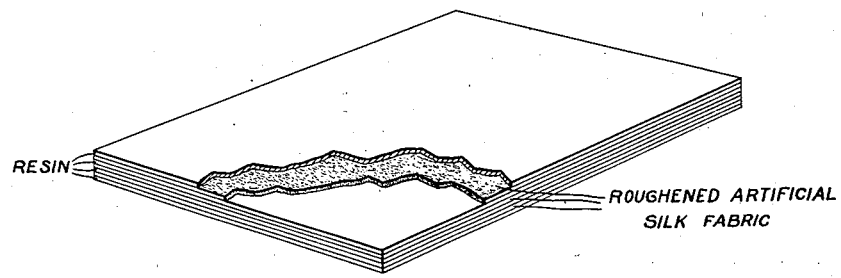
Inventor:
Hans Schuhmann,
by Harry E. Dunham
His Attorney.

UNITED STATES PATENT OFFICE 2,113,434

PROCESS OF MAKING LAMINATED MATERIAL

Hans Schuhmann, Berlin-Frohnau, Germany, assignor to General Electric Company, a corporation of New York Application December 16, 1935, Serial No. 54,776
In Germany December 15, 1934

1 Claim. (Cl. 154—2)

(Granted under the provisions of sec. 14, act of March 2, 1927; 357 O. G. 5)

The present invention relates broadly to a laminated material and to a process of making the same. More particularly it relates to laminated material composed of layers of artificial silk fabric firmly united together by natural or synthetic resin.

Laminated material of various kinds is made by cementing several fabric sheets together, the binder used for this purpose being either natural or synthetic resin. These articles may be formed in the usual manner, as by superposing a plurality of layers of the treated material and subjecting them to relatively high pressure and temperatures. When artificial silk sheets were tried it was found, however, that—in contradistinction to cotton fabrics—such fabrics do not possess the qualities desirable for using resin as a sticking agent, while the final product did not give satisfaction. As a matter of fact the use of artificial silk fabrics instead of cotton fabrics will come to the same effect, the impact strength and flexural strength of artificial silk fabrics being at least as great as those of cotton fabrics. However, laminated material made of artificial silk fabrics shows a greater tendency of separating along the laminations. The cause for this trouble may be found in the surfaces of artificial silk fabrics being very smooth and shiny so that either natural or synthetic resin coatings fail to stick properly. Thus laminated material made in this way always showed an increased tendency of separating along its laminations.

It is the object of my invention to produce laminated material of artificial silk threads or artificial silk fabrics roughened or napped before the resin is applied. The roughening and napping of the artificial silk may be done in any way known to be best suitable, the main object being to get the natural or synethetic resin to adhere tenaciously to the surfaces of the laminae and to bind them firmly together. So the surface of artificial silk fabrics may be prepared in such a way as to get many of the tiny fibre ends of the artificial silk threads raised above the surface of the fabric. Surfaces of this kind may be obtained by well-known mechanical methods of breaking and cutting the artificial silk threads or fabrics at short intervals before the resin is applied. In this way the resin becomes steadied among the single artificial silk threads, and laminated material made of artificial silk fabrics shows no strong tendency to separate along the laminations.

The single figure of the accompanying drawing is a diagrammatic perspective view of a laminated product of the present invention, with a part broken away to show more clearly the layer of roughened artificial silk fabric. Of course it will be understood by those skilled in the art that the resin both coats and impregnates the artificial silk fabric, so that in the laminated end-product there are not such distinct layers of fabric and resin as have been shown in the drawing for purpose of illustrating the invention.

What I claim as new and desire to secure by Letters Patent of the United States, is:

A process of making laminated material composed of superposed layers of artificial silk bonded together with synthetic resin, which comprises mechanically roughening smooth-surfaced artificial silk fabric formed of smooth artificial silk threads to raise above the surface of said fabric tiny fiber ends of said threads, and bonding together superposed layers of said roughened fabric with synthetic resin.

HANS SCHUHMANN.